(12) United States Patent
Foley et al.

(10) Patent No.: US 11,983,748 B2
(45) Date of Patent: May 14, 2024

(54) USING ARTIFICIAL INTELLIGENCE TO DETERMINE A SIZE FIT PREDICTION

(71) Applicant: Stitch Fix, Inc., San Francisco, CA (US)

(72) Inventors: Patrick Foley, San Francisco, CA (US); Bradley J. Klingenberg, San Mateo, CA (US); John McDonnell, San Francisco, CA (US)

(73) Assignee: Stitch Fix, Inc., San Francisco, CA (US)

( * ) Notice: Subject to any disclaimer, the term of this patent is extended or adjusted under 35 U.S.C. 154(b) by 1491 days.

(21) Appl. No.: 15/849,393

(22) Filed: Dec. 20, 2017

(65) Prior Publication Data

US 2019/0073335 A1    Mar. 7, 2019

Related U.S. Application Data

(60) Provisional application No. 62/555,467, filed on Sep. 7, 2017.

(51) Int. Cl.

| | |
|---|---|
| *G06Q 30/0601* | (2023.01) |
| *G06F 16/2457* | (2019.01) |
| *G06F 18/214* | (2023.01) |
| *G06N 20/00* | (2019.01) |
| *G06V 40/10* | (2022.01) |

(52) U.S. Cl.
CPC ... *G06Q 30/0601* (2013.01); *G06F 16/24578* (2019.01); *G06F 18/214* (2023.01); *G06N 20/00* (2019.01); *G06V 40/10* (2022.01)

(58) Field of Classification Search
CPC .................... G06K 9/6256; G06Q 30/0601
See application file for complete search history.

(56) References Cited

U.S. PATENT DOCUMENTS

| | | | |
|---|---|---|---|
| 6,546,309 B1 | 4/2003 | Gazzuolo | |
| 7,194,327 B2 | 3/2007 | Lam | |
| 7,346,421 B2 | 3/2008 | Bijvoet | |
| 8,478,663 B2 | 7/2013 | Lu | |
| 8,762,292 B2 | 6/2014 | Bright | |
| 11,062,377 B1* | 7/2021 | Piroska | ............. G06Q 30/0631 |
| 2008/0255920 A1* | 10/2008 | Vandergriff | ........ G06Q 30/0601 705/26.1 |

(Continued)

OTHER PUBLICATIONS

McAuley et al., "Image-based Recommendations on Styles and Substitutes," (published in Proceedings of the 38th International ACM SIGIR Conference on Research and Development in Information Retrieval, Jun. 2015) (Year: 2015).*

(Continued)

*Primary Examiner* — Resha Desai
*Assistant Examiner* — Patrick Kim
(74) *Attorney, Agent, or Firm* — Van Pelt, Yi & James LLP

(57) ABSTRACT

A predicted size of a specific subject and a predicted size of a specific item are determined using one or more machine learning models. The machine learning models are trained using at least a specified size of the specific subject, feedback of the specific subject regarding sizing of a plurality of items, and feedback of other subjects regarding sizing of the plurality of items. The determined predicted size of the specific subject and the predicted size of the specific item are used to determine a predicted size fit between the specific item and the specific subject.

19 Claims, 9 Drawing Sheets

(56) References Cited

U.S. PATENT DOCUMENTS

| | | |
|---|---|---|
| 2010/0023421 A1 | 1/2010 | Wannier |
| 2010/0111370 A1 | 5/2010 | Black |
| 2011/0083331 A1 | 4/2011 | Hopman |
| 2011/0099122 A1* | 4/2011 | Bright .................. G06Q 10/067 |
| | | 705/348 |
| 2011/0231278 A1* | 9/2011 | Fries .................. G06Q 30/0621 |
| | | 705/26.5 |
| 2013/0066750 A1* | 3/2013 | Siddique ................ G06Q 40/12 |
| | | 705/27.2 |
| 2013/0083065 A1* | 4/2013 | Schulze .................. G06T 19/00 |
| | | 345/633 |
| 2014/0040041 A1 | 2/2014 | Ohnemus |
| 2014/0244431 A1 | 8/2014 | Bright |
| 2014/0358738 A1* | 12/2014 | Ohnemus ........... G06Q 30/0601 |
| | | 705/27.2 |
| 2016/0005070 A1* | 1/2016 | Burr .................... G06Q 30/0253 |
| | | 705/14.51 |
| 2016/0292765 A1* | 10/2016 | Jin ..................... G06Q 30/0629 |
| 2017/0039622 A1 | 2/2017 | Chen |
| 2017/0273383 A1 | 9/2017 | Deguzman |
| 2019/0073335 A1 | 3/2019 | Foley |
| 2020/0320769 A1* | 10/2020 | Chen .................... G06V 10/454 |

OTHER PUBLICATIONS

Hastie et al, "Generalized Additive Models", from Statistical Science, vol. 1, No. 3, pp. 297-310, 1986.

\* cited by examiner

US 11,983,748 B2

USING ARTIFICIAL INTELLIGENCE TO DETERMINE A SIZE FIT PREDICTION

CROSS REFERENCE TO OTHER APPLICATIONS

This application claims priority to U.S. Provisional Patent Application No. 62/555,467 entitled MODELING SIZE BASED ON FEEDBACK filed Sep. 7, 2017 which is incorporated herein by reference for all purposes.

BACKGROUND OF THE INVENTION

A major difficulty for online clothing retailers is perfecting the fit of an item. Traditionally, a customer orders her or his expected size, for example, small, medium, or large, when purchasing an item from an online retailer. The retailer then ships the item to the expecting customer. In the event the item does not fit, the customer often must exchange the item for a different size. The exchange process can be time consuming and may take multiple attempts to achieve a good fit. In some scenarios, even after multiple attempts, a good fit is not possible. For example, inventory may not be available in the correct size or the item may simply not be cut in a way that fits the customer well. These problems are often difficult to anticipate when purchasing online. Moreover, there is no guaranteed consistency in sizing even for items of the same size. A medium in one style is not guaranteed to fit the same as a medium in a different style. Similarly, a size six dress in one style is not guaranteed to fit the same as another dress in size six. Even when sizing is roughly consistent for a particular brand, there is no guaranteed consistency across different brands. In some scenarios, a professional human stylist assists in selecting the appropriate size of products for customers. However, size selection is difficult for even a professional human stylist to accurately predict without being able to measure the customer. This difficulty is compounded for online retailers whose customers may never physically meet a stylist. Therefore, there exists a need for a method to predict the size fit of an item for a particular individual.

BRIEF DESCRIPTION OF THE DRAWINGS

Various embodiments of the invention are disclosed in the following detailed description and the accompanying drawings.

DETAILED DESCRIPTION

Figure 1:
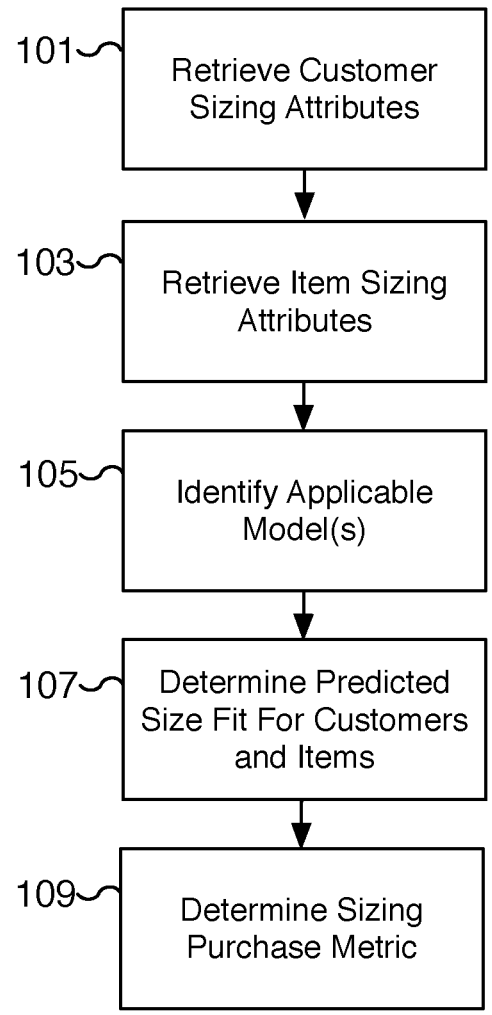
FIG. 1 is a flow chart illustrating an embodiment of a process for determining a predicted size fit between an item and a subject.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Modeling size based on feedback and using artificial intelligence to determine a size fit prediction is disclosed. Using artificial intelligence and machine learning, one or more machine learning models may be trained using sizing information for customers and sizing information from clothing and footwear items. Customers' sizing information is collected from customers. Sizing information on clothing and footwear items is collected from customer feedback. Sizing information may also be collected by directly measuring the clothing and footwear. A predicted size for a specific customer and a predicted size for a specific item, whether clothing or footwear, are used to determine a predicted size fit of the item on the customer. The predicted size is utilized to predict how well the item fits the customer and the likelihood the customer will purchase the item.

In various embodiments, a processor is used to determine a predicted size of a specific subject and a predicted size of a specific item using one or more machine learning models. For example, one or more machine learning models are used to infer the size of each customer from a customer database and each item, such as a clothing and/or footwear item, available for purchase. One or more machine learning models are trained using at least a specific size of the specific subject, feedback of the specific subject regarding sizing of a plurality of items, and feedback of other subjects regarding sizing of the plurality of items. For example, the training corpus may include sizing information from the customer such as the customer's size measurements. Customer size measurements may include height, weight, body mass index (BMI), top size, bottom size, chest, and/or cup size. The training corpus may also include feedback from the customer on the size fit of one or more clothing or footwear items the customer has tried on. Feedback may include information to describe the size fit such as feedback that the item is too big, too small, or fits perfectly. More specific feedback may include details such as the item is too tight in the chest or too loose in the thighs. Additional training data may include feedback of other customers regarding the sizing of items the other customers have tried as well as their sizing information. Using the predicted size of the specific subject and the predicted size of the specific item, a predicted size fit between the specific item and the specific subject is determined. For example, based on the predicted size of a customer and the predicted size of an item, a size fit prediction is determined. The size fit prediction may be a probability the item fits the customer well. In some embodiments, a low size fit prediction is a prediction the item will fit poorly and a high size fit prediction is a prediction the item will fit well.

In some embodiments, customer sizing information includes the customer's sizing measurements as well as particular fit challenges or fit preferences for the customer. For example, a customer may have a broader than average neck and has a challenge finding shirts that fit her or his neck properly. As another example, a customer may have a larger than average thigh circumference and has difficulty fitting many styles of pants. As an example of a fit preference, a customer may prefer loose fitting shirts over tight fitting shirts. In some embodiments, sizing information of the items includes classifying each item into a silhouette and having a corresponding sizing profile. A sizing profile may include detailed measurements particular for that item and/or silhouette. Thus a dress and a long sleeve shirt have different silhouettes and thus different points of measurements that correspond to different dimensions associated with its silhouette. In various embodiments, the feedback may be sourced from a customer, a stylist, a designer, and/or a supplier, among others.

In some embodiments, the size prediction utilizes more than a single size relationship. For example, clothing size may be too small, too large, or just right as three possible responses to size fit. The predicted size fit may be solved by using an ordinal logistic likelihood function for fitting multiple classifiers simultaneously. In the example, two classifiers are fitted simultaneously: one classifier for too small v. just right and one for just right v. too large. In some embodiments, the framing utilizes a polytomous Rasch Model. In some embodiments, the models are solved using item response theory. The item response theory equation results in an outcome indicating a size prediction (too small, just right, or too large) and a threshold for the response size for the customers and products.

In some embodiments, once a size fit prediction is determined, the size fit prediction may be utilized to determine a sizing purchase metric. In various embodiments, the sizing purchase metric corresponds to the impact size fit has on a particular customer's likelihood to purchase the particular item. In various embodiments, the sizing purchase metric takes into account how much sizing impacts a purchase decision. For example, for some styles and/or silhouettes, a good fit is required for a customer to purchase the item. In contrast, for some styles and/or silhouettes, a good fit is not critical. As an example, for most customers, a suit jacket must fit well for the customer to purchase the item compared to a cardigan, which for most customers does not require a good fit for the customer to be satisfied with the fit and purchase.

In some embodiments, a size fit prediction is utilized to create a custom size measurement. For example, each customer may have a custom size measurement that describes the best fit for the particular customer. Different sized customers may have different custom size measurements. As another example, an online retailer may employ custom size measurements for each customer. As additional size feedback is received on the size of customers and the size of products, each customer's custom size dynamically changes to become more accurate. In various embodiments, from a customer's standpoint, she or he does not need to know the actual measurements associated with her or his size or when the size dynamically adjusts as it becomes more accurate. In various embodiments, the customer size measurements are referred to as "Size You" to indicate that the size is customized and calibrated to each individual customer.

In some embodiments, the size fit prediction of products and customers may be utilized to adjust inventory and/or to manufacture products based in part on an optimal size fit. For example, based on the predicted size, an online retailer may adjust the number of sizes to carry for each product to match the retailer's customers. Instead of, for example, carrying twenty different sizes of a product when its customers only match to five of the twenty sizes, the retailer proactively trims its inventory and carries only the specific five sizes that optimally fit its customers. Similarly, a retailer can manufacture products that are custom fitted to its customers based on predicted size fit. The manufactured products can be sized to the customers' sizes instead of standard sizes. For example, the manufactured products can be sized based on continuously approximated custom sizes instead of rounding to the nearest standard size.

In various embodiments, the sizing purchase metric is utilized by a recommendation engine to suggest potential items for styling a customer. In some embodiments, the size fit prediction and/or sizing purchase metric is used by the recommendation engine to rank recommendations and/or exclude items from being recommended. For example, items may be ranked by the likelihood the customer will purchase the item. For certain items requiring a good fit, the recommendation engine will more heavily weigh the size fit prediction. In some embodiments, the sizing purchase metric incorporates the importance of size fit towards a customer's purchase decision. Moreover, a sizing purchase metric is combined with other models, such as style, sales, and inventory models to determine the likelihood each item will be purchased by a customer. The results may be presented to a human stylist to select a complete outfit for the customer to trial. In various embodiments, a stylist selects one or more items from the recommendation engine for a customer to trial based on the customer's sizing, style preferences, and/or attributes.

FIG. 1 is a flow chart illustrating an embodiment of a process for determining a predicted size fit between a subject and an item. The process of FIG. 1 may be utilized to determine the likelihood that a subject, such as a customer, will purchase a particular item, such as a clothing and footwear item, based on the predicted size fit of the item on the subject. For example, for many items, the better the fit, the higher the likelihood a customer will purchase the item. In some embodiments, the process of FIG. 1 is used by a recommendation engine to determine a rank order between items. The ranking may be utilized to promote and/or exclude items for recommendation to a customer. In some embodiments, the ranked order is used by a stylist to help select items for a customer.

Figure 2:
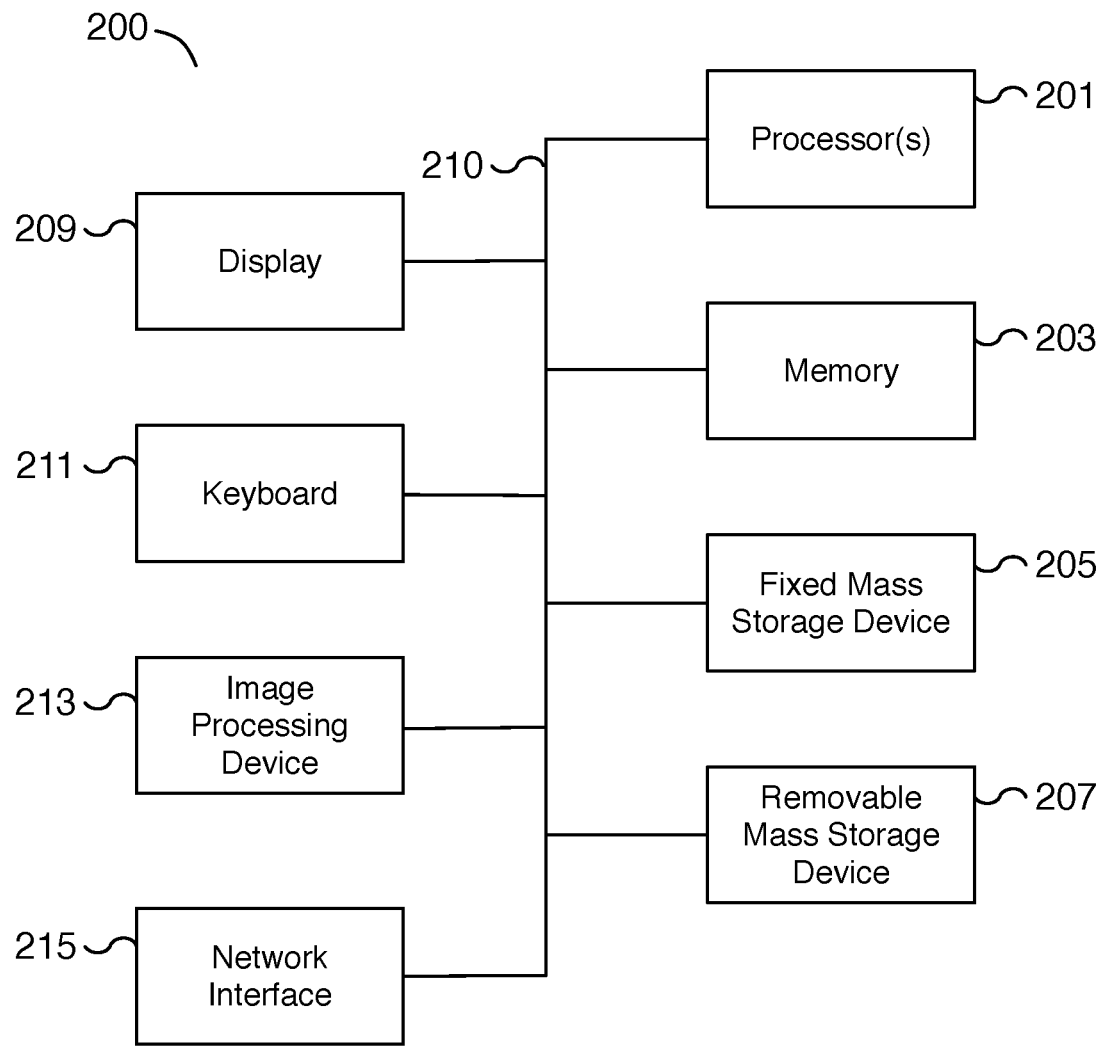
FIG. 2 is a functional diagram illustrating a programmed computer system for determining a predicted size fit between a subject and an item.

In various embodiments, the process of FIG. 1 is performed by processor 201 of FIG. 2. The process of FIG. 1 may be at least in part implemented on one or more components of system 300 shown in FIG. 3. For example, the process may be performed by utilizing size fit analysis engine 307, design tool 309, and data platform 313 with respect to feedback data store 301, sizing profile data store 303, and inventory interface 305. In some embodiments, the process of FIG. 1 utilizes a machine learning model trained using the process described with respect to FIG. 6.

At 101, customer sizing attributes are retrieved. In some embodiments, the sizing attributes are retrieved from one or more storages, such as feedback data store 301 of FIG. 3. In various embodiments, customer sizing attributes include sizing information provided by the user. For example, a customer provides her or his height, weight, body mass index (BMI), top size, bottom size, chest, cup size, and/or shoe size, as applicable. Additional detailed measurements may be provided by the customer and may include additional measurements such as the customer's shoulder width, inseam, waist, shirt size, pant size, etc. In some embodiments, the customer provides particular fit challenges that impact sizing. In various embodiments, fit challenges may include body specific challenges for achieving a good size fit. Examples of fit challenges include sleeve length is too long or short, thigh diameter is too small, and chest is too loose or tight. In some embodiments, the customer also provides fit preferences. Fit preferences may include preferences between different options such as slim v. regular v. relaxed or fitted v. loose shirts. For example, when a new customer creates an account, the customer is able to input the customer's sizing attributes, including measurements, challenges, and preferences. In various embodiments, customer sizing attributes, including sizing, measurements, fit challenges, and preferences, may be inferred based on feedback from the customer and other customers and need not be provided directly by the customer. For example, feedback may be collected when any user purchases an item and provides feedback on how the item fits. In various embodiments, customers include new customers, past customers, potential customers, customers created for testing purposes, and any other appropriate subject for predicting size fit.

At 103, item sizing attributes are retrieved. In some embodiments, the sizing attributes are retrieved from one or more storages, such as feedback data store 301 and/or sizing profile data store 303 of FIG. 3. Sizing attributes may include how well a particular item fits on one or more customers and may be based on customer feedback. For example, a particular shirt may be labeled as a medium but fit too large on most customers who typically purchase and are satisfied with the fit of a medium shirt. As another example, customers may identify certain fit issues with a particular item. For example, one or more customers who have purchased a particular shirt may provide feedback that the sleeves are too short.

In some embodiments, the sizing attributes include and are based on the item's silhouette and/or points of measurements of the items. For example, in some embodiments, a silhouette category is identified for an item. A product silhouette category may be used to define a unique category of items that share the same general cut, shape, and in some cases material. In some embodiments, the item shape and/or cut as well as material or construction additionally define an item silhouette. Examples of silhouette categories include sport coats, long sleeve tops, short sleeve tops, three-quarter sleeve tops, pull over tops, sleeveless tops, shorts, and jeans, among others. Examples of material and/or construction include woven, knit, and denim, among others. In various embodiments, a silhouette is associated with points of measurements. The points of measurements may be unique to a silhouette and detail the measurements used to help define the size of an item. As an example, a long sleeve knit dress shirt may require the points of measurement to include measurements for the neck opening, shoulder-to-shoulder, chest, waist, hem, neck band, front neck drop, front body length, sleeve length from armhole to edge, under sleeve length from armhole to edge, bicep, and sleeve opening. In various embodiments, additional or fewer measurements may be appropriate depending on the item's silhouette and the precision required for the size fit prediction.

In some embodiments, a combination of customer sizing feedback on the item, the item's labeled size, for example, the size as indicated by the manufacturer, and/or an item's points of measurements is retrieved when retrieving an item's sizing attributes. For example, some items may only include sizing attributes based on the item's manufacturer labeled size. As another example, some items may only include sizing attributes based on the item's manufacturer labeled size and customer sizing feedback. In various embodiments, the data associated with the sizing attributes of an item accumulates over time as additional customer feedback is collected. In some embodiments, an item is measured and the sizing attributes include one or more measurements of the item's points of measurements. In some embodiments, an item's measurements are based on or referenced to a similar item, for example, an item with a similar item identifier, stock keeping unit (SKU), and/or silhouette.

At 105, applicable machine learning models are identified. Machine learning models may include trained models generated from a machine learning process such as the process of FIG. 6. In various embodiments, one or more machine learning models are identified and utilized based on features of the customers and/or items. In some embodiments, a separate machine model may exist for different item types and/or silhouettes. For example, different machine learning models may exist for footwear, tops, and bottoms. As another example, different machine learning models may exist based on a customer feature, such as a different model for children, men, and women customers. In various embodiments, at least one of the models is trained using customer sizing from customers and customer feedback regarding the size of one or more items. For example, sizing data from customers is utilized with feedback from customers on the sizing of items as training data for training a machine learning model.

At 107, a predicted size fit for customers and items is determined. For example, for each customer and each item, a predicted size fit is determined. The size fit prediction corresponds to how well the specific item is predicted to fit the specific customer. The size fit prediction may include a prediction for the probability the item is too large, too small, and/or fits perfectly. In some embodiments, the prediction incorporates a customer's fit challenges and/or fit preferences. For example, in the event a customer prefers a loose instead of a tight fit for shirts, the predicted size fit for the customer and shirt items incorporates a preference for loose shirts and may penalize shirts that are tight fitting.

In some embodiments, the predicted size fit for customers and items are solved using models based on item response theory. The predicted size fit may be solved by using an ordinal logistic likelihood function for fitting multiple classifiers simultaneously. For example, using three clothing sizes: too small, too large, or just right, two classifiers are fitted simultaneously: one classifier for too small v. just right and one for just right v. too large. In some embodiments, the framing utilizes a polytomous Rasch Model to analyze polytomous items. The item response theory equation results in an outcome indicating a size prediction (too small, just right, or too large) and a threshold for the response size for the customers and products. For example, for highly negative size differences between a customer and item (i.e., the customer's size is much smaller than the item size), the "too large" response is most likely. As the size difference decreases, "just right" responses increase and become the dominant response when the difference is close to zero. For highly positive size differences (i.e., the customer's size is much larger than the item size), "too small" responses are most common.

In various embodiments, for new customers with little or no sizing data, a predicted size is based on the initial signup information provided by the customer, such as the customer's own estimated size and size measurements. As the customer rates and provides feedback on items, the prediction for the customer's true size becomes increasingly accurate. In various embodiments, the accuracy of the predicted size fit over time improves with each item the customer provides sizing feedback on. In some embodiments, the accuracy further increases for each item that is similar to any of the items the customer has provided feedback on and with feedback from other customers on the same items.

In some embodiments, the determined predicted size fit is based on a predicted size for the customer and a predicted size for the item. For example, a latent or predicted size is first determined for each customer and each item based on the sizing attributes retrieved in 101 and 103. In various embodiments, the predicated size fit is based on the difference between a predicted size of the customer and the predicted size of an item. In some embodiments, an absolute value or square of the difference between the latent size of the customer and latent size of the item is utilized.

In various embodiments, the predicted size determined for a customer is the customer's latent size and represents the customer's predicted actual size. In some embodiments, the latent size is represented using a different measurement unit from a manufacturer's traditional method for measuring sizes. For example, manufacturers typically denote sizes using labels such as small, medium, and large or may use numeric sizes for certain items such as dresses and footwear. In various embodiments, a customer's predicted latent size is represented using a numeric scale that has a finer granularity than the standard measurement methods used by clothing manufacturers. In some embodiments, a customer's latent sizing includes one or more metrics to define the customer's actual size. For example, the sizing for a customer's top may include a sizing metric representing the customer's neck, chest, torso length, and/or arm length, among others. In various embodiments, a customer's predicted latent size is not a collection of actual or predicted measurements of the customer's body but predicted metrics that reflect and are a proxy for the customer's sizing. For example, the sizing may be a set of numeric metrics but may not correspond to standard measurement units such as inches or centimeters.

In various embodiments, a customer's predicted latent size may be used to define a custom size for the customer. In a similar manner, in various embodiments, an item's latent size is determined and represents the item's predicted actual size. In some scenarios, the actual size and the labeled size as provided from the manufacturer are different. By learning over time the actual size of the item and the actual size of the customer, the predicted size fit between an item and the customer can be determined and optimized.

At 109, a sizing purchase metric is determined. For example, a sizing purchase metric may be determined for each customer and item combination based on the predicted size fit of the item for the customer. In some embodiments, a sizing purchase metric is a metric measuring the impact sizing has on a customer's decision to purchase the item. For example, some items are only purchased when a good fit can be achieved. In contrast, other items may not require a good fit for a customer to purchase. In various embodiments, a size purchase metric may be a penalty imposed on the probability a customer will purchase the item in the event the size does not fit well. In some embodiments, a size purchase metric corresponds to how harshly to penalize a size mismatch and may be used when ranking different items for determining which of one or more items to recommend to a customer. In various embodiments, a different sizing penalty may be associated with different styles of items and/or silhouettes. In some embodiments, the penalty may be based on the material of the item.

In some embodiments, the sizing purchase metric is utilized as one of the factors impacting the overall probability a client will purchase an item. For example, additional factors other than the sizing purchase metric may include style preferences, pricing preferences, shipping and/or availability preferences, and past purchases, among other factors. The overall probability a client will purchase the item may be utilized to rank items for recommendation and/or to hide an item from being recommended. By including a sizing purchase metric into the overall likelihood a customer will purchase an item, the rank order takes into account not only style, pricing, past purchases, and other factors impacting purchase decisions, but also the importance of size fit as a factor. In some embodiments, a user interface for ranking and/or displaying items for recommendation includes a display of a predicted size fit, a sizing purchase metric, and/or an overall probability a client will purchase the item. In some embodiments, the predicted size fit sizing purchase metric is displayed as a user interface element. For example, the probability the item is too large or too small is displayed as a user interface element next to a representation of the item. In some embodiments, a user interface element in the form of a badge is displayed next to a representation of the item that indicates the item is likely too large or too small.

Figure 3:
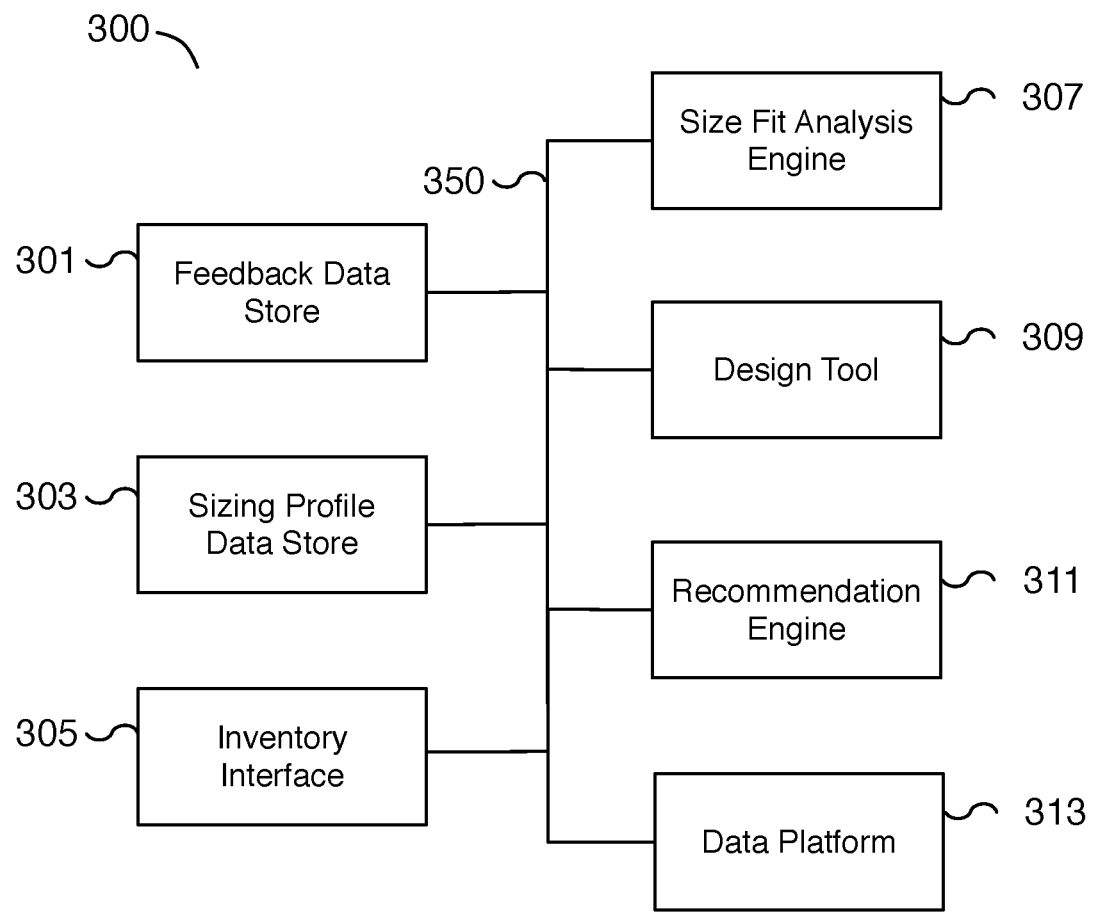
FIG. 3 is a block diagram illustrating an embodiment of a system for determining a predicted size fit between an item and a subject.

In various embodiments, the sizing purchase metric is utilized to determine a rank order for items to suggest to a customer for purchase. For example, a recommendation engine, such as recommendation engine 311 of FIG. 3, may rank items based in part on the sizing purchase metric. A stylist may select items from the ranked listing to suggest to a customer. By ranking the items, a stylist is provided with a user interface tool that incorporates size fit prediction into the stylist's recommendations. In various embodiments, the predicted size fit determined at 107 and/or the sizing purchase metric determined at 109 is determined by using size fit analysis engine 307, design tool 309, and/or recommendation engine 311 of FIG. 3. In some embodiments, feedback data store 301, sizing profile data store 303, and/or inventory interface 305 of FIG. 3 is utilized to retrieve feedback, sizing, and/or inventory information, which may be used to determine which items to recommend for purchase.

FIG. 2 is a functional diagram illustrating a programmed computer system for determining a predicted size fit between an item and a subject. As will be apparent, other computer system architectures and configurations can be used to perform the described product generation technique. Computer system 200, which includes various subsystems as described below, includes at least one microprocessor subsystem (also referred to as a processor or a central processing unit (CPU) 201). In some embodiments, computer system 200 is a virtualized computer system providing the functionality of a physical computer system. For example, processor 201 can be implemented by a single-chip processor or by multiple processors. In some embodiments, processor 201 is a general purpose digital processor that controls the operation of the computer system 200. In some embodiments, processor 201 also includes one or more coprocessors or special purpose processors (e.g., a graphics processor, a network processor, etc.). Using instructions retrieved from memory 203, processor 201 controls the reception and manipulation of input data received on an input device (e.g., keyboard 211, image processing device 213, etc.), and the output and display of data on output devices (e.g., display 209).

In some embodiments, processor 201 is used for determining a predicted size fit between an item and a subject. In various embodiments, processor 201 is used to train a machine learning model for predicting sizes of customers and items. Once trained, processor 201 utilizes the machine learning model to determine a predicted size of a specific subject, a predicted size of a specific item, and a predicted size fit between the specific subject and the specific item. The predicted size fit is provided using processor 201 for use in determining a sizing purchase metric and for determining a rank order of the specific item with respect to other items.

In some embodiments, processor 201 includes and/or is used to provide elements 101, 103, 105, 107, and 109 with respect to FIG. 1. In some embodiments, processor 201 is used to communicate with or provide the functionality of data stores 301 and 303 and inventory interface 305 of FIG. 3. In some embodiments, processor 201 is utilized by the elements 307, 309, 311, and 313 of FIG. 3. In some embodiments, processor 201 performs the processes described below with respect to FIGS. 4, 5A, 6 and 7.

Processor 201 is coupled bi-directionally with memory 203, which can include, for example, one or more random access memories (RAM) and/or one or more read-only memories (ROM). As is well known in the art, memory 203 can be used as a general storage area, a temporary (e.g., scratch pad) memory, and/or a cache memory. Memory 203 can also be used to store input data and processed data, as well as to store programming instructions and data, in the form of data objects and text objects, in addition to other data and instructions for processes operating on processor 201. Also as is well known in the art, memory 203 typically includes basic operating instructions, program code, data, and objects used by the processor 201 to perform its functions (e.g., programmed instructions). For example, memory 203 can include any suitable computer readable storage media described below, depending on whether, for example, data access needs to be bi-directional or uni-directional. For example, processor 201 can also directly and very rapidly retrieve and store frequently needed data in a cache memory included in memory 203.

A removable mass storage device 207 provides additional data storage capacity for the computer system 200, and is optionally coupled either bi-directionally (read/write) or uni-directionally (read only) to processor 201. A fixed mass storage 205 can also, for example, provide additional data storage capacity. For example, storage devices 205 and/or 207 can include computer readable media such as magnetic tape, flash memory, PC-CARDS, portable mass storage devices such as hard drives (e.g., magnetic, optical, or solid state drives), holographic storage devices, and other storage devices. Mass storages 205 and/or 207 generally store additional programming instructions, data, and the like that typically are not in active use by the processor 201. It will be appreciated that the information retained within mass storages 205 and 207 can be incorporated, if needed, in standard fashion as part of memory 203 (e.g., RAM) as virtual memory.

In addition to providing processor 201 access to storage subsystems, bus 210 can be used to provide access to other subsystems and devices as well. As shown, these can include a display 209, a network interface 215, an input/output (I/O) device interface 211, an image processing device 213, as well as other subsystems and devices. For example, image processing device 213 can include a camera, a scanner, etc.; I/O device interface 211 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 200. Multiple I/O device interfaces can be used in conjunction with computer system 200. The I/O device interface can include general and customized interfaces that allow the processor 201 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 215 allows processor 201 to be coupled to another computer, computer network, or telecommunications network using a network connection as shown. For example, through the network interface 215, the processor 201 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 201 can be used to connect the computer system 200 to an external network and transfer data according to standard protocols. For example, various process embodiments disclosed herein can be executed on processor 201, or can be performed across a network such as the Internet, intranet networks, or local area networks, in conjunction with a remote processor that shares a portion of the processing. Additional mass storage devices (not shown) can also be connected to processor 201 through network interface 215.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 211 and display 209 share the touch sensitive screen component, which both detects user inputs and displays outputs to the user). In addition, bus 210 is illustrative of any interconnection scheme serving to link the subsystems. Other computer architectures having different configurations of subsystems can also be utilized.

FIG. 3 is a block diagram illustrating an embodiment of a system for determining a predicted size fit between an item and a subject. In some embodiments, the predicted size fit between an item and a subject uses the processes described herein on the system of FIG. 3. The example system 300 shown in FIG. 3 includes feedback data store 301, sizing profile data store 303, inventory interface 305, size fit analysis engine 307, design tool 309, recommendation engine 311, and data platform 313. Each of these components may be communicatively coupled via network 350. In some embodiments, system 300 is used to perform the processes described with respect to FIGS. 1, 4, 5A, 6, and 7.

The feedback data store 301 and sizing profile data store 303 may be configured to store information about customers, products, sales data, performance metrics, and machine learning models. In some embodiments, feedback data store 301 may be utilized for storing feedback from users or customers and sizing profile data store 303 may be utilized for storing sizing profile data regarding different products. In some embodiments, feedback data store 301 and sizing profile data store 303 may exist as a single unified data store or spread across multiple data stores.

In some embodiments, the feedback data store 301 stores information including customer or user feedback on size, fit rating, quality, print/style, and price for any test fitted item. In various embodiments, feedback on customer size stored in feedback data store 301 includes the customer's sizing and/or customer measurements. In some embodiments, the feedback includes feedback from a stylist, designer, and/or supplier. In some embodiments, the feedback includes customer size measurements, fit challenges, and fit preferences. In various embodiments, the feedback includes a corresponding reference to an item with sizing profile information in sizing profile data store 303. In some embodiments, an item is referenced using an item identifier or a stock keeping unit (SKU). Information in feedback data store 301 about an item may be stored with statistics such as a sales metric (e.g., statistics related to sales of an item or group of items), an inventory metric (e.g., statistics related to inventory such as number of units in inventory), variety (e.g., a measure of diversity of inventory and related information such as addressable market), etc.

In some embodiments, sizing profile data store 303 stores sizing profile information including data associated with a product or group of products. In some embodiments, sizing profile information is categorized by product silhouette category. A product silhouette category may be used to define a unique category of items, such as sport coats, long sleeve tops, short sleeve tops, three-quarter sleeve tops, pull over tops, sleeveless tops, shorts, and jeans, among others. In some embodiments, the item shape as well as material or construction additionally define a silhouette. Examples of material and/or construction include woven, knit, and denim, among others. For each item, sizing profile information includes measurements for the item for each size. In some embodiments, measurements are taken based on the silhouette category and different silhouette categories include different measurements. For example, measurements for a pant silhouette may include a waist, inseam, thigh, front leg opening, and back leg opening measurement, among others. In contrast, measurements for a short sleeve knit top may include a neck opening, shoulder-to-shoulder, chest, sleeve length from armhole, and bicep measurement, among others. Sizing profile information may also include product information such as objective attributes of the product such as a stock keeping unit (SKU), item type, item property (e.g., color, pattern, material), etc. Product information may include subjective attributes of the product such as suitability for body types, season, etc. Product attributes may be identified by a human or by a machine. Product information may include a representation of the product such as text, image, video, or other form of data.

The inventory interface 305 may be configured to store and retrieve inventory information from one or more inventory data stores. In some embodiments, the inventory interface is an interface to one or more local or remote inventory data stores. For example, using the inventory interface, inventory information may be retrieved and/or updated via a vendor hosting one or more inventory data stores remotely. In some embodiments, an inventory data store includes one or more first-party inventory systems hosted either locally or remotely. In some embodiments, inventory data stores may be structured based on warehouses such that each warehouse has a corresponding inventory data store. In some embodiments, different inventory data stores utilize different interfaces, such as different application programming interfaces or query languages. The inventory interface translates inventory requests and updates to and from the components of FIG. 3 using the appropriate inventory data store interface. In various embodiments, inventory information may include item or product inventory information including a stock keeping unit (SKU), an item type, an item property (e.g., color, pattern, material), a silhouette category, quantity for each product, as well as historical information along with other similar appropriate inventory information.

In various embodiments, the inventory interface is used to access information about how many units of each item are in the inventory. Supply chain information such as how many units of an item have been ordered, when they are expected to be received to replenish a stock of the item, etc. may be accessed via the inventory interface.

The size fit analysis engine 307 determines fit analysis for items by utilizing data from the feedback data store and sizing profile data store. For example, the size fit analysis engine may be utilized to determine a predicted size fit between an item and a subject. In some embodiments, size fit analysis engine 307 utilizes the data platform to retrieve and/or update data related to feedback, sizing, and/or inventory. The size fit analysis engine utilizes the data platform to retrieve feedback on sizing from customers and the sizing profile of the item and/or related items to determine the predicted size fit between an item and a subject. In some embodiments, the size fit analysis engine may further utilize the data platform to determine the inventory status of one or more items. For example, when performing a size fit analysis, the size fit analysis engine may utilize inventory information, including historical inventory information, to determine the recommendations based on size fit and availability.

The design tool 309 may be configured to employ adaptive machine learning to help a designer select or design items for the customers according to the customers' tastes. The designed items may be a hybrid of a base item sized up or down based on variable size components. For example, in the event the predicted size fit indicates that there are no available items that fit well, the design too may be further utilized to custom design an item that results in a predicted size fit that fits well. In various embodiments, the design tool may be configured to execute the processes described herein to help design a product, where the product determines a predicted size fit. For example, a designer may use the design tool 309 to create a new item from a base item. The selection of one or more values for variable size components may be based on an optimization goal such as increasing the size fit satisfaction. Thus, the item may be a result of a combination of machine learning/artificial intelligence selected variable size components, where the variable size components are automatically determined to be among the best measurements to meet an optimization goal. For example, values for the variable size components may be ranked according to how well each meets the size fit satisfaction goal.

For example, to at least in part predict a size fit between an item and a subject, a system aggregates data collected from a customer, stylist, and/or designer and measurement data from items. The data platform may build one or more trained models using machine learning processes further described herein. The training data to train the models may be based on behavior and/or feedback of the customer, stylist, and/or the designer as stored over time in the feedback data store, sizing profile information related to items as stored in the sizing profile data store, and/or an inventory database accessible via the inventory interface. When a designer selects an item, the size fit analysis engine is used to predict a size fit between an item and a subject. The predicted size fit is presented via the design tool to the designer. In some embodiments, the designer may choose to size up or down the item from the customer's indicated size based on the predicted size fit. For example, a medium size of a particular item may fit better than a large size despite the customer's stated size as a large.

The recommendation engine 311 may be configured to employ adaptive machine learning to provide recommendations to stylists who select items for customers from an item inventory. For example, the system may use a machine learning trained model to score products. The top scoring products may be provided to the stylist. The stylist (e.g., a human) then selects one or more of the top scoring products to be offered to a customer. The customer may purchase/keep the product and/or provide feedback about the product. The feedback may be used to improve the machine learning training models and may be stored in feedback data store 301.

The data platform 313 may be configured to coordinate operation of feedback data store 301, sizing profile data store 303, inventory interface 305, size fit analysis engine 307, design tool 309, and recommendation engine 311. For example, when data is generated by interaction of a customer, stylist, designer, and/or supplier with system 300, the data platform 313 may determine what information is to be stored and where. For example, the data platform may store the feedback data in the feedback data store and sizing profile data in the sizing profile data store. The data platform may also store the data as part of a training data set for machine learning as further described herein. As another example, when measurement data is received for different items, the data platform may store the measurement data as a sizing profile in the sizing profile data store. As a further example, the data platform may determine to store inventory related data using the inventory interface. For example, in the event the inventory count for a particular item needs to be retrieved, the data platform may determine that the inventory interface is the appropriate component from which to retrieve the information. The data platform may direct the request for inventory updates to the inventory interface. In various embodiments, data platform 313 may be communicatively coupled to feedback data store 301, sizing profile data store 303, inventory interface 305, size fit analysis engine 307, design tool 309, and recommendation engine 311.

In various embodiments, size fit analysis engine 307, design tool 309, and recommendation engine 311 may be configured to perform the processes described herein, e.g., the processes shown in FIGS. 1, 4, 5A, 6, and 7, to determine a predicted size fit for an item and a customer. The system 300 may receive input, automatically make size fit predictions using machine learning/artificial intelligence, and generate design recommendations and/or product recommendations.

Figure 6:
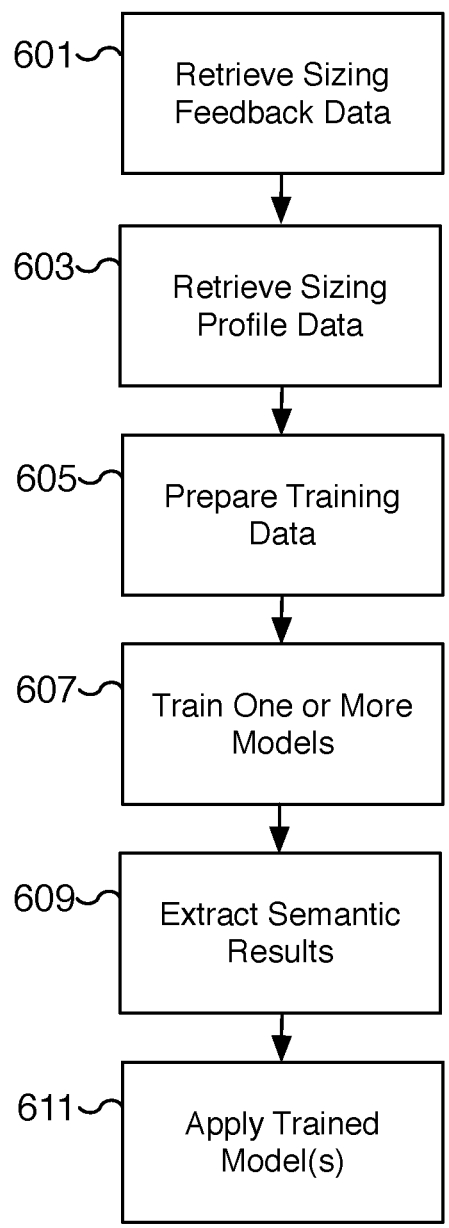
FIG. 6 is a flow chart illustrating an embodiment of a process for machine learning to train one or more prediction models for determining a predicted size fit between a subject and an item.

Machine learning models may include trained models generated from a machine learning process such as the process of FIG. 6. Trained models may be categorized by type such as feedback models, sizing profile models, inventory models, variety models, etc. For each category of model, a model may be generated for each of one or more segments such as segments based on one or more of the following: an item silhouette, target body type, a target seasonality, a target fiscal quarter, a target customer type or business line (e.g., women, men, children), a target lifestyle, a target product type (e.g., blouse, dress, pants), a target style (e.g., edgy, urban, Pacific Northwest), etc. A model may correspond to a particular segment such as a client segment, time period, etc. For example, a first model may be for the sales performance of a product for a group of customers with a first body type such as petite and a second model may be for the performance of a product for a group of customers with a second body type such as tall.

In some embodiments, a machine learning trained model can be utilized to predict a size fit between an item and a subject. The model may be trained using customer sizing information, customer product fit feedback, and product sizing information. The various sizing information is incorporated into the training corpus to predict a size fit between an item and a subject. The training corpus may be trained based on a selected silhouette category, product category, and/or customer category, among others. In some embodiments, the size fit prediction includes a predicted latent size for the customer and/or items.

In various embodiments, other models may be utilized. Example models include models for style rating, size rating, fit rating, quality rating, retention, personalization, style grouping, and price value rating as further described herein with respect to FIGS. 1, 4, 5A, 6, and 7. These models may be utilized in combination with sizing feedback and measurements to predict a size fit but also other optimization goals including quality, retention, personalization, style, and price value goals.

In some embodiments, the design tool, size fit analysis engine, feedback data store, sizing profile data store, inventory interface, and data platform may be configured to perform the processes described herein, e.g., the processes shown in FIGS. 1, 4, 5A, 6, and 7. In some embodiments, the components of FIG. 3 may be communicatively coupled to one another to perform the processes shown in FIGS. 1, 4, 5A, 6, and 7 on input received at the size fit analysis engine 307 and/or the design tool 309.

Figure 4:
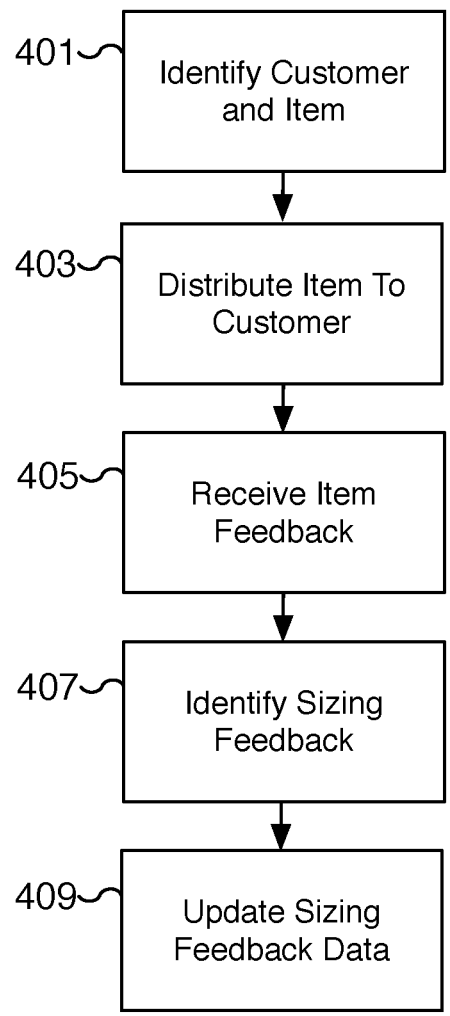
FIG. 4 is a flow chart illustrating an embodiment of a process for collecting sizing feedback.

FIG. 4 is a flow chart illustrating an embodiment of a process for collecting sizing feedback. In some embodiments, the feedback is collected from various users including customers, designers, stylists, and/or vendors. Once collected, the feedback related to sizing information is utilized for training a machine learning model. In some embodiments, once a model is trained, new feedback may be incorporated into the training corpus to update the model. In various embodiments, the feedback may be utilized to train more than one model. In some embodiments, the feedback collected is used for a training process such as the training process described with respect to FIG. 6. In some embodiments, the feedback collected is stored in a feedback data store such as feedback data store 301 of FIG. 3. As described, the process of FIG. 4 collects sizing feedback from a single item for a single customer. The process may be performed over many customers and with multiple items to increase the amount of sizing feedback collected. Moreover, the process may be repeated with the same customer for different items or the same item with different customers.

At 401, a customer and item is identified. In some embodiments, the item is identified by a stock keeping unit (SKU) or an item identifier. The item identifier is used to associate the feedback with a sizing of the item. In some embodiments, the identification of the item includes determining a silhouette category for the item. In various embodiments, the customer is identified by a customer identifier or other unique identifier.

At 403, the item of 401 is distributed to the customer of 401. In some embodiments, the item is distributed to a customer after first being recommended by a stylist. The item may be recommended to the customer via the recommendation engine 311 of FIG. 3. In some embodiments, the item is distributed to a customer who is interested in purchasing the item. For example, a stylist selects a five-piece outfit collection for a customer. Each of the five items of the outfit are identified in 401 and distributed to the customer at 403. As an example, the collection may include a long sleeve top, a cardigan, a knit skirt, and leggings. In various embodiments, the customer may also include stylists, designers, and vendors who may provide feedback on sizing. In various embodiments, the recommended items are based on a predicted size fit using the processes described herein, especially with respect to FIG. 1.

At 405, item feedback is received. For example, a customer receiving an item at 403 may access a feedback form for providing feedback on the item. In some embodiments, the feedback is an online form, such as a website, where feedback may be provided. In some embodiments, the feedback may be provided over email, SMS, instant messenger, via online chat, over the phone, or other appropriate means. In various embodiments, the feedback includes feedback on the item style, sizing, fit, quality, print, and price. In some embodiments, the size rating is the accuracy of the listed size. For example, the customer provides feedback on whether an item labeled a size 6 actually fits as the customer expects a size 6 would fit. In some embodiments, the fit rating is a feedback rating on how well the item fits regardless of the labeled size. For example, a customer may believe that he or she is a size medium for a t-shirt. In the event the item the customer test fits is labeled as an extra-large size but fits well, the customer would respond with a high fit rating but possibly a low size rating. Additional feedback may include information on retention, personalization, style, material, and other input, as appropriate, in order to achieve recommendation optimization goals.

In some embodiments, feedback on the item includes feedback on the customer. For example, customer feedback may include the customer's sizes, measurements, fit challenges, and fit preferences. As an example, sizes and measurements associated with the customer may include a height, weight, body shape (slim, regular, fit, husky, etc.), chest size, shoulder size, cup size, waist, inseam, shirt size (e.g., small, medium, large), pant size (e.g., inseam and waist), etc. In some embodiments, measurements associated with the customer are very limited and may only include a few measurements such as the customer's height, canonical shirt size (e.g., small, medium, or large), and canonical pant size. For example, information for a male user may include the user's height, e.g., 5'8" and wears a size medium shirt and 32×32 pants. As another example, information for a female user may include the customer's height, cup size, and dress size.

In some embodiments, customer feedback includes fit challenges that apply to a particular item or a set of items. Examples of fit challenges include sleeve lengths are typically too long or short, cut of pants in the thigh are often too tight, shirts are too tight fitting in the chest, etc. In some embodiments, a customer is presented with a list of fit challenges from which to select from and to provide customer feedback. In various embodiments, the customer provides feedback via an online form, email, in text, or other appropriate means.

In some embodiments, customer feedback includes fit preferences that apply to a particular item or a set of items. For example, a customer may have a fit preference for slim over regular or relaxed dress shirts. As another example, a female user may have a preference for loose rather than fitted tops. In some embodiments, the fit preferences may be matched to a variable size component or point of measurement of an item or silhouette. For example, fitted and loose fit preferences for female users may be matched to variable size components associated with chest measurements and cup size. In various embodiments, fit challenges and preferences may be utilized to predict a size fit.

In some embodiments, certain sizing feedback is customized based on the item or silhouette category. As an example, a silhouette category including denim pants may include fit questions related to the sizing for the waist, thighs, and ankles. As another example, a silhouette category including knit dress shirts may include fit questions related to the sizing for the sleeves, shoulders, biceps, and button spacing. In some embodiments, the fit questions are very simple and consist of selecting from one of only a few narrow options such as "too small," "just right," and "too big." In some scenarios, it may be beneficial to the customer user experience by limiting the amount of detail requested from the customer regarding fit. In some embodiments, an initial sizing feedback includes a very simple request for feedback with only a few limited response options but additional detailed feedback may be supplied or requested.

At 407, sizing feedback is identified. For example, the feedback received at 405 includes feedback that is sizing related and not sizing related. In some embodiments, sizing feedback is parsed from the feedback and stored separate from the other feedback. As an example, fit ratings and size ratings data are identified from the feedback received at 405. Non-sizing feedback, such as pricing feedback, style feedback, and pattern feedback may be stored in the same or in a separate data store from sizing feedback. In some embodiments, feedback that impacts sizing but is not related to a measurement of size is also identified as sizing feedback. For example, the material of the item may be utilized in determining a predicted size fit since the material has an impact on how well the item fits. As another example, the item silhouette category impacts fit ratings since some silhouettes, such as leggings, have a more universal fit and may fit a large variety of body sizes and shapes whereas other silhouettes, such as a suit coat, require many precise points of measurement to ensure an accurate fit.

At 409, sizing feedback data is updated. In some embodiments, the sizing feedback identified at 407 is stored in a feedback data store and used to update a machine learning model. For example, the fit ratings and size ratings feedback data may be stored in a feedback database such as feedback data store 301 of FIG. 3. In various embodiments, the feedback stored is utilized to train a machine learning model to predict size fit and/or size fit satisfaction. In various embodiments, the feedback stored is utilized to train a machine learning model to determine the predicted size fit between an item and a subject. In some embodiments, a machine learning model is retrained once a sufficient amount of new feedback is received, when the feedback has aged, at regular intervals, and/or when appropriate.

In some embodiments, the feedback may be associated with a weight or confidence rating corresponding to how much the feedback should be considered when training the machine learning model. For example, feedback from different customers or classes of customers may be weighed differently. The feedback from a stylist or designer may be weighed more than a new customer who is unfamiliar with sizing conventions. In some embodiments, customer feedback is weighed more heavily than feedback from other customers, such as a vendor. In some embodiments, the confidence assigned to a customer's feedback is based on the past history of the customer's feedback. For example, in the event a customer has feedback that is very consistent with other customers' feedback, then the customer's feedback may be weighed more heavily than another customer whose feedback is very sparse and/or mismatched with other customers' feedback.

Figure 5A:
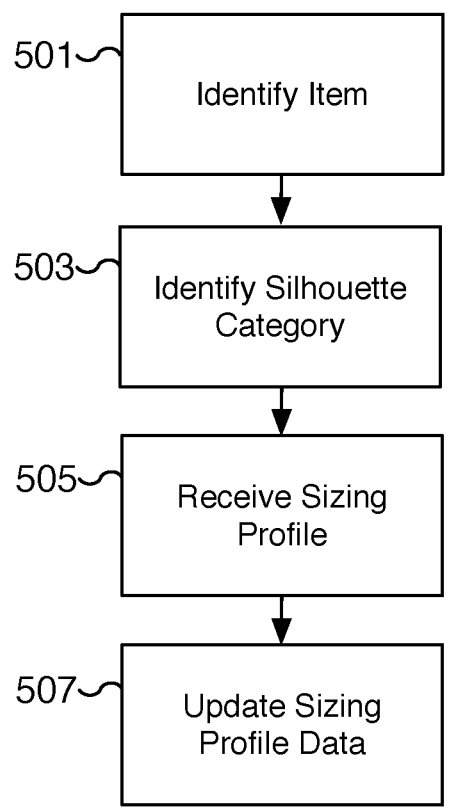
FIG. 5A is a flow chart illustrating an embodiment of a process for collecting sizing profiles.

FIG. 5A is a flow chart illustrating an embodiment of a process for collecting sizing profiles. In some embodiments, the sizing measurements for various items are collected for training a machine learning model to determine the predicted size fit between an item and a subject. In some embodiments, once a model is trained, new item sizing data may be incorporated into the training corpus to update the model. In various embodiments, the sizing data may be utilized to train more than one model. In some embodiments, the sizing data collected is used for a training process such as the training process described with respect to FIG. 6. In some embodiments, the sizing data collected is stored in a sizing profile data store such as sizing profile data store 303 of FIG. 3. In various embodiments, the sizing profile information is used in addition to customer feedback on item sizing to increase the accuracy of predicted size fits.

At 501, an item is identified. For example, a new item is made available and selected for inclusion into the training data set. In some embodiments, the item may be a new item available for customers to purchase. At 501, the item is identified using an item identifier such as a stock keeping unit (SKU). In some embodiments, the item identifier is used to associate the item's sizing measurements with customer sizing feedback from test fitting the item.

At 503, the silhouette category of the item of 501 is identified. For example, an operator may select the silhouette category an item belongs to. In some embodiments, the item silhouette category is determined automatically using image recognition and/or a machine learning application of image recognition to classify the item into a silhouette category.

At 505, a sizing profile for the item of 501 is received. As discussed previously, in some embodiments, an item silhouette defines various points of measurement for an item. The item's points of measurement are received and a sizing profile using those measurements is created. In some embodiments, the sizing profile for an item is stored in a sizing profile data store such as sizing profile data store 303 of FIG. 3. As an example, a designer determines the item's silhouette at 503 and provides the corresponding points of measurement for the item at 505. In some embodiments, the vendor and/or manufacturer of the item provides the measurements.

At 507, sizing profile data is updated. In some embodiments, the sizing profile data received at 505 is stored in a sizing profile data store and used to update a machine learning model. For example, the sizing profile data may be stored in a sizing profile database such as sizing profile data store 303 of FIG. 3. In various embodiments, the sizing profile stored is utilized to train a machine learning model to determine the predicted size fit between an item and a subject. In some embodiments, a machine learning model is retrained once a sufficient amount of new sizing profile data is received, when the sizing profile data has aged, at regular intervals, and/or when appropriate.

Figure 5B:
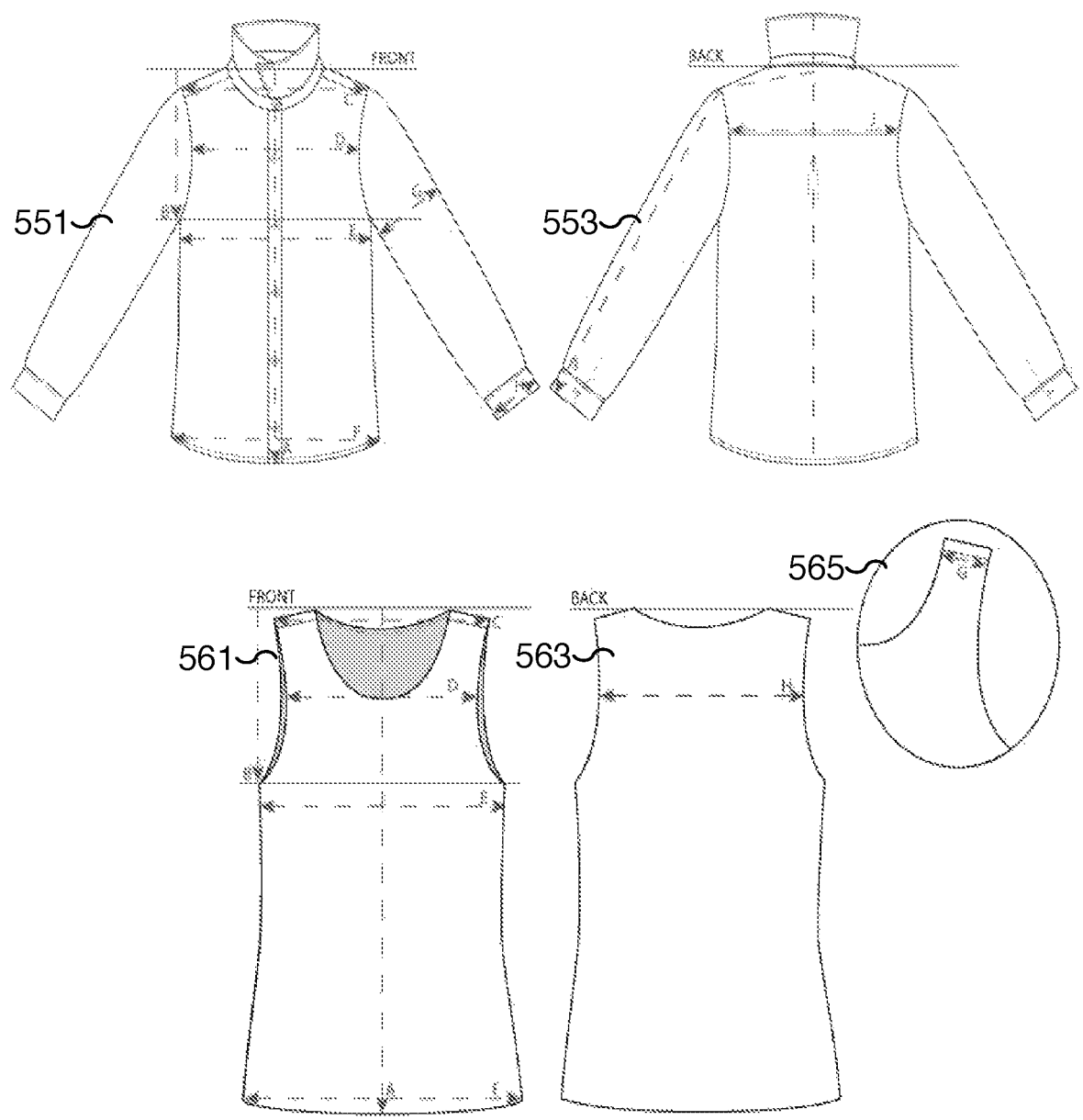
FIG. 5B is a diagram illustrating various embodiments of measurement data collected for creating sizing profiles.

FIG. 5B is a diagram illustrating various embodiments of measurement data collected for creating sizing profiles. In some embodiments, sizing information on an item includes detailed measurements of the item. For example, each item silhouette category includes a list of measurements, or points of measurement, that are critical to an item's fit. Depending on the accuracy of the fit, more or fewer points of measurement may be required. The diagram of FIG. 5B includes the front and back of a long sleeve shirt silhouette category and the front, back, and shoulder of a sleeveless pull-over silhouette category. A long sleeve shirt front 551, a long sleeve shirt back 553, a sleeveless pull-over front 561, a sleeveless pull-over back 563, and a sleeveless pull-over shoulder 565 are shown. In some embodiments, the measurement data collected is used for a training process such as the training process described with respect to FIG. 6. In some embodiments, the measurement data collected is stored in a sizing profile data store such as sizing profile data store 303 of FIG. 3.

With respect to long sleeve shirt front 551, examples of points of measurement and their corresponding alphabet labels include a body length from high point shoulder (A), armhole depth from high point shoulder (B), across shoulder (C), across front 5" from high point shoulder (D), chest 1" from armhole (E), sweep straight (F), bicep 1" from armhole (G), and sleeve opening (H). With respect to long sleeve shirt back 553, the points of measurement and their corresponding alphabet labels include sleeve length from center back neck (I) and across back 5" from high point shoulder (J).

As another example, a sleeveless pull-over front, back, and shoulder are shown with corresponding points of measurement for a sleeveless pull-over item silhouette category. With respect to sleeveless pull-over front 561, examples of points of measurement and their corresponding alphabet labels include body length from high point shoulder (A), armhole depth from high point shoulder (B), across shoulder (C), across front 5" from high point shoulder (D), chest 1" from armhole (E), and sweep straight (F). With respect to sleeveless pull-over back 563, an example of a point of measurement and its corresponding alphabet label includes across back 5" from high point shoulder (H). With respect to sleeveless pull-over shoulder 565, an example of a point of measurement and its corresponding alphabet label includes strap width for each side along seam (G).

FIG. 6 is a flow chart illustrating an embodiment of a process for machine learning to train one or more prediction models for determining a predicted size fit between a subject and an item. The process of FIG. 6 may be at least in part implemented on one or more components of system 300 shown in FIG. 3. In some embodiments, the process of FIG. 6 is performed by processor 201 of FIG. 2. In some embodiments, the models trained using the process of FIG. 6 are utilized by the processes for FIGS. 1 and 7.

At 601, sizing feedback data is retrieved. In some embodiments, sizing feedback data is retrieved from a feedback data store such as feedback data store 301 of FIG. 3. The sizing feedback data includes sizing information from customers who have tested a particular item. The sizing feedback data may include customers' size attributes, sizing ratings, and fit ratings. In some embodiments, customers' size attributes include size measurements, fit challenges, and fit preferences of the customers. For example, size measurements may include the body shape, height, and weight of the customers as well as more detailed measurements such as a customer's shoulder width, inseam, waist, chest, cup size, shirt size, pant size, etc., as available. In some embodiments, fit challenges are utilized and may include body specific challenges for achieving a good fit rating. Examples of fit challenges include sleeve length is too long or short, thigh diameter is too small, and chest is too loose or tight. In some embodiments, fit preferences are utilized and may include body specific preferences such as slim v. regular v. relaxed or fitted v. loose shirts. In some embodiments, the sizing rating reflects a customer's feedback on the accuracy of the size label for a given item. In some embodiments, the fit rating reflects how well the given item fits a customer. In various embodiments, the feedback data includes an item identifier, such as a stock keeping unit (SKU), for preparing the data and merging the feedback data with sizing profile data.

At 603, sizing profile data is retrieved. In various embodiments, sizing profile data includes sizing measurements and sizing measurement information taken on items and may be used in addition to sizing feedback generated by customers. In some embodiments, sizing profile data is retrieved from a sizing profile data store such as sizing profile data store 303 of FIG. 3. In some embodiments, the sizing profile data is retrieved only for items that have customer feedback. In some embodiments, sizing profile data is retrieved only for items of the same silhouette category. In various embodiments, the sizing profile data includes various measurements or points of measurement of the item. In some embodiments, the measurements are associated with an item silhouette category. In various embodiments, the sizing profile data includes an item identifier, such as a stock keeping unit (SKU), for preparing the data and merging the sizing profile data with customer feedback data.

At 605, training data retrieved at 601 and 603 is prepared. For example, the customer feedback and sizing profile data for a particular item is collected, merged, and prepared into a training data for a training corpus. In some embodiments, the data is prepared into a training data set and a validation set. Thus a portion of the data is utilized for training and a separate portion is utilized for validating the training results.

In some embodiments, different prediction models can be trained for different prediction model categories or segments. To train each of the different models, different sets of training data can be gathered specifically for different models to be trained. For example, past data associated with a latent size prediction for a particular item silhouette category is gathered for various different segments, and different models of the particular silhouette category may be trained for each of the various different segment combinations.

In some embodiments, the preparation of the training data includes selecting learning features and parameters. The selection of features to be utilized in prediction models can be defined at least in part by a human user or at least in part by automatically being determined. For example, a human or artificial intelligence may define features of the prediction models to be trained and thus the necessary training data.

In various embodiments, the features may be based at least in part on natural language processing (NLP). For example, a computer system may extract information from text according to NLP techniques. Text generated by and about customers such as in product reviews, comment forms, social media, emails, and the like may be analyzed by an NLP system to determine customer size and fit ratings. For example, a customer may provide feedback (e.g., text) when they receive an item. The feedback provided by the customer may be processed with NLP techniques to extract features. NLP techniques include rule-based engines, clustering, and classification to make determinations about characteristics of a product that might be considered a feature. Features may be identified by machine learning or computer vision or NLP, and recommended for inclusion in a product design. In various embodiments, term frequency-inverse document frequency (TFIDF), latent Dirichlet allocation (LDA), colocation analyses, and the like can be used to create lower-dimensional representations of styles or to generate words or phrases representing styles. Various machine learning methods can then predict metrics/optimization goals using these features. Features that predict the optimization goal can then be related back to size fit prediction components based on item silhouette categories.

At 607, one or more machine learning models are trained using the training data prepared at 605. In supervised machine learning, training data may be utilized to train a prediction model to perform predictions based on information "learned" from the training data. In some embodiments, more than one machine learning model is trained. For example, models may be trained by categorized type such as by item silhouette category (e.g., knit blouse, woven dress, denim pants, etc.), target body type, target seasonality, target fiscal quarter, target customer type or business line (e.g., women, men, children), target lifestyle, target style (e.g., edgy, urban, Pacific Northwest), etc. Different client and item segments may be used to categorize the model types depending on the optimization goal.

In various embodiments, the model may be trained according to supervised learning or other machine learning techniques. In supervised learning, the objective is to determine a weight of a feature in a function that optimizes a desired result, where the function is a representation of the relationship between the features. In a training process, weights associated with features of a model are determined via the training. That is, the contribution of each feature to a predicted outcome of the combination of features is determined. In various embodiments, the model may be trained using mixed effects models that take into account several features, some of which may be non-independent. The model may be trained by ridge regression that attributes credit to a particular feature.

In some embodiments, when training a model, the attribution of each feature to the output of the function is determined. In some embodiments, a feature represents a combination of features. For example, an individual feature may have a different weighting when that feature is combined with another feature. A feature or set of features may define a base option. As more input is provided to a model, the output of the function becomes closer to a target or validation result.

In various embodiments, a model may be evaluated after the model has been trained. The error of a model is the difference between actual performance and modeled performance. In another aspect, in some situations, a well-trained model may nevertheless diverge from an actual result. In this situation, a product may have an aspect that makes the product perform better than expected. For example, the item may perform better, such as fit better, than predicted by a trained model. The description of the factor for success is an aspect. This aspect can be leveraged by incorporating the aspect into a new item.

In some embodiments, the one or more trained models are generalized mixed effects models. Some of the terms for the model are learned parameters and others are regularized by modeling them with a specified distribution. To address the risk of overfitting when scaling to millions of customer and items, some terms are modeled using a Gaussian distribution. For example, distributions are added that rely on the learned variances for the sizes of customers and items.

At 609, semantic results are extracted from a machine learning model. For example, in training a neural network machine learning model, the input passes through multiple layers of the network. In various embodiments, two or more layers are utilized to achieve the final output. In some embodiments, the final layer of the network is used to predict the size fit of a customer and an item. For example, the final layer may output a size fit prediction indicating the probability an item is predicted to be too large, too small, or fit perfectly on a subject. In some embodiments, the final layer of the network is used to predict the latent size of a customer and/or the latent size of an item. At 609, information is extracted from an intermediate layer. In various embodiments, information from intermediate layers are semantically interpretable and infer information about the data along dimensions that exceed the final output layer. For example, in the event the final output layer predicts a size fit, an intermediate layer may determine multiple axes that impact size fit, such as where a user lies along different axes that span characteristics such as tall or short, athletic or not-athletic, slim or husky, etc. Moreover, the intermediate layers may be used to place a customer and/or item into a multi-dimensional space defined by the layer. In some embodiments, the customers and/or items may be clustered based on the intermediate layers. In some embodiments, semantic information is extracted from the intermediate layers to determine characteristics of the customers and/or items. In various embodiments, data from one or more intermediate layers is used as a proxy for size predictions.

At 611, one or more trained machine learning models are applied. In some embodiments, for each model type, multiple versions of the model exist. As additional data is collected and prepared, new versions of the model are trained and prepared for production use. For example, as customers test fit new items, additional sizing information is collected for the item and added to a training set for an item silhouette category. Training with the additional data allows for a more accurate training model. In some embodiments, once a model has been validated, the model is transferred to a production system and utilized with a machine learning engine for use in determining a predicted size fit between an item and a subject. For example, a trained machine learning model is transferred into a machine learning engine, such as size fit analysis engine 307 of FIG. 3, and utilized by a design tool and/or recommendation engine, such as design tool 309 and recommendation engine 311 of FIG. 3, for determining a predicted size fit between an item and a subject.

Figure 7:
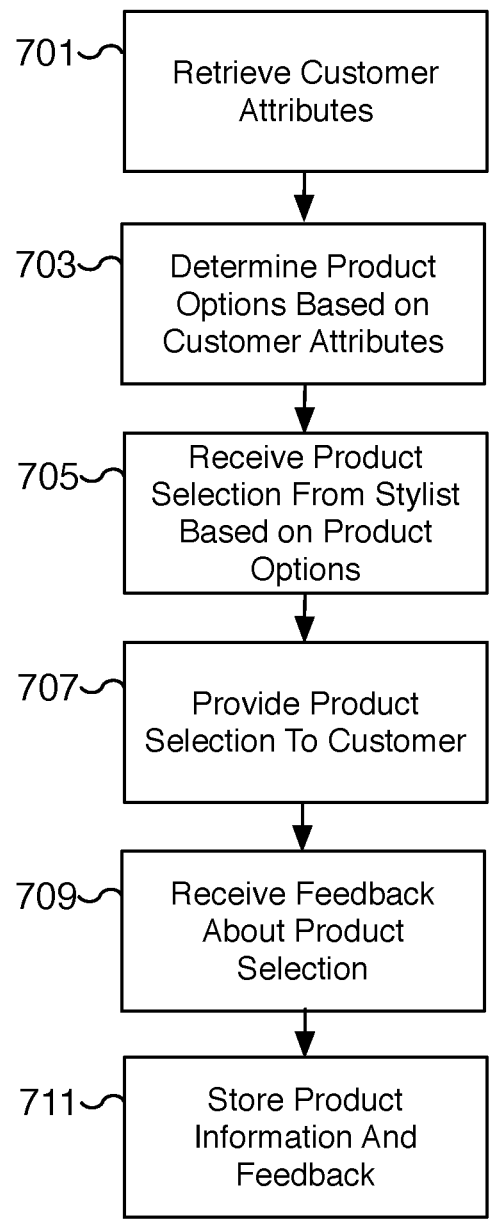
FIG. 7 is a flow chart illustrating an embodiment of a process for selecting and providing products based on a predicted size fit.

FIG. 7 is a flow chart illustrating an embodiment of a process for selecting and providing products based on a predicted size fit. For example, using the processes described herein to predict a size fit between an item and a subject, the predicted size fit can be utilized to select and provide a product to a customer that matches the customer's preferences. The process of FIG. 7 may be at least in part implemented on one or more components of system 300 shown in FIG. 3. For example, the process may be performed by utilizing size fit analysis engine 307, recommendation engine 311, design tool 309, and data platform 313 with respect to feedback data store 301, sizing profile data store 303, and inventory interface 305. In some embodiments, the process of FIG. 7 is performed by processor 201 of FIG. 2.

At 701, a customer's attributes are retrieved. A customer's attributes may include objective attributes such as biographical information and sizing measurements. Customer attributes may include subjective attributes such as preferences for style, fit, colors, designers/brands, budget, etc. For example, a customer may rate specific styles, prints, and/or attributes including those products in an inventory and products from other providers. A customer's attributes include sizing attributes such as the customer's sizes, measurements, fit challenges, and/or fit preferences. The information may be collected through third party apps or platforms such as apps that allow a user to indicate interests and/or share interest in products with other users. Customer attributes may be collected when a customer enrolls with the system. For example, the customer may complete a survey about his or her measurements (height, weight, etc.), lifestyle, and preferences. This information may be stored to a customer profile. Customer sizing feedback may be stored in a feedback data store such feedback data store 301 of FIG. 3. Customer attributes may be determined from social media and content created or curated by the customer on third party platforms such as Pinterest®, Instagram®, Facebook®, LinkedIn®, and the like.

When the customer makes purchases and provides feedback on products, customer attributes may be updated. For example, the customer profile and feedback may be updated. The customer may provide feedback in various formats including completing surveys, writing product reviews, making social media posts, and the like regarding one or more products. Products recommended to the customer may be adapted to a customer's changing attributes and taste. In one aspect, the customer's taste may be learned over time by a computer system and/or stylist. Customers may also provide sizing feedback. For example, an item may fit too large, too small, or perfectly. As another example, an item may have sleeves that are too long. In one aspect, the customer's sizing may be learned over time by a computer system and/or stylist.

In various embodiments, customer attributes may be determined based on generalizations about other users who share characteristics with a particular customer. Generalizations about groups of customers may be made from individual customer attributes. Customers may be grouped by any characteristic, including gender, body type, shared preference (e.g., a measure of similarity between clients such as clients' objective, subjective, and/or sizing attributes or learned similarity in product preferences), and the like.

At 703, product options are determined based on the customer attributes. The product options may be determined by processing the customer attributes to select a subset of products from all products in an inventory. The product options may be provided to stylists. In various embodiments, instead of directly offering all of the product options to the customer, a stylist first selects products from among the product options to provide to the customer. In various embodiments, the product options are determined in part based on a predicted size fit. For example, a predicted size fit between an item and the customer is determined using the process of FIG. 1. The predicted size fit may be used to rank the item amongst other items. The ranked order of suggested items may be provided to the customer or a stylist. In some embodiments, the rank order utilizes a sizing purchase metric as described with respect to FIG. 1. In various embodiments, a stylist is presented with a ranked order of items based on the sizing purchase metric. For example, the top ranked item is the item determined to be most likely to be purchased by the customer if selected for the customer based on size fit. In various embodiments, the predicted size fit may be weighed differently and is based on the item and customer when determining a sizing purchase metric. For example, predicted size fit can be configured to have little impact on the sizing purchase metric for products, such as scarfs, where fit is not critical, but may we weighed heavily when size fit is critical such as for a suit jacket. In some embodiments, the weight applied to predicted size fit may vary depending on customer preference. For customers that highly value a good fit, the predicted size fit may be weighed more heavily when determining a sizing purchase metric. In various embodiments, the variable weights are applied to calculate a sizing purchase metric and utilized in ranking items by likelihood to purchase. In some embodiments, the user interface for a stylist and/or customer includes a representation of the predicted size fit and/or sizing purchase metric of the item on the customer.

In various embodiments, the predicted size fit is one of many factors used to determine the likelihood a customer will purchase the item. For example, one or more additional models, such as sales models, inventory models, variety models, rating models, etc. are used in addition to a predicted size fit model. For example, each trained model may receive as input a feature or combination of features and predict/score a performance metric such as sales metric, inventory metric, variety metric, style rating, size rating, fit rating, quality rating, retention, personalization, style grouping, and price value rating.

In various embodiments, a plurality of models are trained and each model corresponds to a respective performance metric. For example, a sales model is trained to determine a sales metric, an inventory model is trained to determine an inventory metric, an inventory model is trained to determine an inventory metric, and rating models may be used to determine style rating, size rating, fit rating, quality rating, retention, personalization, style grouping, and price value rating. The models may be trained with training data sets, where the training data sets correspond to particular categories and segments. In various embodiments, a predicted size fit model is trained to determine a sizing purchase metric, such as the sizing purchase metric determined at 109 of FIG. 1. The sizing purchase metric is used, along with other metrics, as described above, to determine an overall likelihood to purchase metric.

At 705, a product selection is received from a stylist based on the product options. A stylist (e.g., a human user) selects a product selection from the product options. The product selection may then be offered to a customer. Suppose a customer is looking for blouses. One or more blouses may be automatically selected from the inventory based on the customer's attributes. Instead of providing the blouses directly to a customer, a stylist selects a sub-set of blouses to offer to the customer. Statistics about the product selection such as whether an item was selected to be part of the product selection, when the item was selected to be part of the product selection, for who/what type of customer was the item selected, etc. can be stored. In various embodiments, the stylist may rely on the predicted size fit to select items that are predicted to fit the customer well. Similarly, the stylist may rely on the predicted size fit to exclude items from being selected that are predicted to fit poorly.

In various embodiments, a human stylist is informed of the product options with the addition of purchase metrics such as a likelihood to purchase metric. For example, the likelihood to purchase metric incorporates a predicted size metric and may incorporate other metrics such as a sales metric, an inventory metric, and metrics based on style, quality, retention, personalization, style grouping, price value, etc. A human stylist may use the overall likelihood to purchase metric to inform the stylist's selection of products for a customer. By ranking potential options using the determined metrics and providing inferred purchase information for each of the product options, a stylist is able to make a more informed selection for her or his customer. The stylist can incorporate her or his human expertise on style, sizing, fit, etc. with quantified purchasing metrics determined using artificial intelligence and machine learning. The final product selection is influenced both by the uniquely human qualities of the stylist, such as the stylist's expertise and the stylist's relationship and understanding of the customer, as well as data science based on past purchase decisions and feedback of collective customers.

At 707, a product selection is provided to a customer. A shipment of items may be provided to a customer. The customer may then decide to keep or return one or more of the items in the shipment. If the customer decides to keep an item, then the customer purchases the item. Statistics about the items such as whether they were kept or returned, when they were kept or returned, who/what type of customer kept or returned the item can be stored.

At 709, feedback about the product selection is received. A customer may provide feedback about the product selection such as reasons why the customer is keeping or not keeping one or more items in the product selection. In various embodiments, a customer provides sizing feedback on the product selection provided in 707. For example, the customer may provide feedback indicating a blouse is too loose or too tight in the chest. As another example, a customer may provide feedback that a pair of jeans fits perfectly. Feedback may be provided using a coarse granularity such as too large, too small, or fits perfectly. Feedback may also be provided using a finer granularity such as the thigh opening is too tight or the sleeves are too short by two inches. The feedback may be provided by the customer in various formats including completing surveys, writing product reviews, making social media posts, and the like. The feedback may be stored and associated with the customer and/or the item.

At 711, information about the product selection and/or feedback is stored. For example sizing information may be stored in a database such as feedback data store 301 or sizing profile data store 303 of FIG. 3. In some embodiments, the information stored includes fit challenges and fit preferences of the customer. The information about a customer's sizing and/or a product item's sizing may be extracted to learn and predict over time by a computer system and/or stylist the sizing of customers and product items. In some embodiments, the stored information is used to train one or more machine learning models as described with respect to FIG. 6. In various embodiments, product item feedback is stored using an associated identifier or a stock keeping unit (SKU) and customer feedback is stored using an associated customer identifier.

Figure 8:
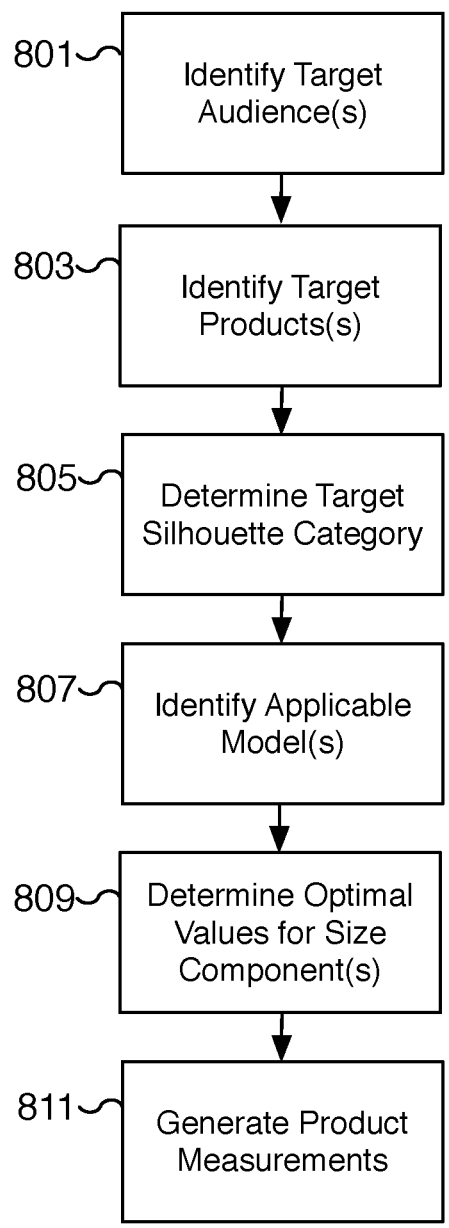
FIG. 8 is a flow chart illustrating an embodiment of a process for determining item sizes for manufacturing.

FIG. 8 is a flow chart illustrating an embodiment of a process for determining item sizes for manufacturing. In the example shown, the process of FIG. 8 may be utilized to generate the measurements necessary for the manufacture of an item based on predicted size fit. In some embodiments, the predicted size measurements are utilized to determine a sizing purchase metric that may be combined with predicted style recommendations and inventory recommendations to determine the clothing most likely to be purchased by customers. In some embodiments, a likelihood to purchase metric includes additional factors such as variety, quality, retention, personalization, style grouping, price value, etc. In some embodiments, the determination is performed on a subset or a cluster of customers to achieve a customized sizing and styling fit for a particular target audience. For example a subset of customers include groupings based on target customer type or business line (e.g., women, men, children), a target lifestyle, a target product type (e.g., blouse, dress, pants), a target style (e.g., edgy, urban, Pacific Northwest), etc. Groups may also be based on preferences such as colors, designers/brands, budget, etc. The process of FIG. 8 may be at least in part implemented on one or more components of system 300 shown in FIG. 3. For example, the process may be performed by utilizing size fit analysis engine 307, design tool 309, recommendation engine 311, and data platform 313 with respect to feedback data store 301, sizing profile data store 303, and inventory interface 305. In some embodiments, the process of FIG. 8 is performed by processor 201 of FIG. 2.

At 801, one or more target audiences are identified. Different target audiences may be identified by a human operator or automatically. For example, target audiences may be identified automatically by clustering users by feature set. The feature set may include properties of the target user including user measurement sizes, user fit challenges, user fit preferences, user purchase history, user style preferences, user location, pricing preferences, etc. As another example, target audiences may target difference customer profiles such as petite, maternity, or plus-sized preferences. Target audiences may also target a different target customer type or business line (e.g., women, men, children), a target lifestyle, a target product type (e.g., blouse, dress, pants), a target style (e.g., edgy, urban, Pacific Northwest), etc.

At 803, one or more target products are identified. For example, popular products are identified and may be determined based on metrics including purchase history and return metrics. In some embodiments, popular products are determined based on clustering the purchase history for customers. In some embodiments, products are identified based on features such as inventory information, profit margin, and customer retention. In some embodiments, features include not only purchase history but also social media activity, web browsing activity, surveys, product reviews, seasonality, and the like. In various embodiments, a human operator determines the target products. In some embodiments, the target products are determined automatically or may be identified using artificial intelligence and/or machine learning with the assistance of a human, such as a designer or stylist.

At 805, a target silhouette category is determined based on the target products of 803. In some embodiments, a human may select the target silhouette category that corresponds to the products that measurements will be determined for. In various embodiments, the target silhouette category is selected automatically or by a human with the help of an automated system. For example, the target products identified at 803 are analyzed and used to determine one or more options for target silhouette categories. In some embodiments, inventory is accessed to determine stock levels, which may be used in deciding a target silhouette category. For example, a knit three-quarter length shirt may be selected as a target silhouette category in the event that knit three-quarter length shirts are popular but are low in inventory. As another example, knit three-quarter length shirts may be selected in the event that knit three-quarter length shirts from a particular brand are frequently purchased but have a high return rate for poor size fit satisfaction. The creation and availability of a new products using the products silhouette category but optimized for size fit satisfaction will have a high likelihood of achieving a lower return rate.

At 807, applicable machine learning models are identified. In various embodiments, the appropriate machine learning model is selected based on the target goal(s). For example, the model may be selected based on the target audience of 801 and target silhouette category of 805. In some embodiments, the models are selected based on the features associated with the target audience and target product silhouette. For example, a model associated with knit three-quarter length shirts and maternity customers may be selected. In some embodiments, different models may be selected to optimize for different factors. For example, a sales model, retention model, and/or quality model may be selected to optimize for sales, retention, and/or quality, respectively.

At 809, optimal values for variable size components are determined. The machine learning model identified at 807 is used in conjunction with the target audience and target silhouette category to determine a size fit satisfaction. In some embodiments, the values for variable size components are determined by optimizing the size fit satisfaction. For example, size fit satisfaction may be optimized by applying a cost function analysis. The values for the variable size components corresponding to an optimum size fit satisfaction are presented as the optimal values for the variable size components. For example, the sleeve length and chest size corresponding to a dress shirt that achieves the optimal size fit satisfaction for the target audience are the determined values for the respective variable size components.

In some embodiments, size fit is one or many factors to optimize for. For example, in addition to size fit, the products may be optimized for sales, sell through rate, quality, retention, turn-around-time for manufacturing, etc. In various embodiments, the models identified in 807 are utilized to incorporate the additional factors on top of the determination for the optimal values for variable size components.

At 811, product measurements are generated. In various embodiments, the measurements may be utilized for the manufacture of a newly sized product. In some embodiments, the measurements may be used for generating a design sheet having specifications for manufacturing the newly sized product. For example, the measurements generated correspond to variable size components such as sleeve length, across shoulder, sweep straight, sleeve opening, etc., necessary for the accurate manufacturing of a product to achieve a high fit rating. In various embodiments, the generated product is custom sized to the target audience. By varying the target audience, different size variations of the same style of product may be generated and manufactured. In this manner, a range of sizes for a particular product style may be manufactured to cover the entire customer base with a high likelihood that all customers will have a size available that fits well. The quantity of each generated product may be based on the size of the target audience. In this manner, inventory levels may be optimized based on fit for potential customers. Material, pattern, quality, and other manufacturing choices may be optimized in addition to the sizing based on the models identified in 807 and utilized in 809.

The process of FIG. 8 is an example embodiment for the application of a machine learning model and machine learning engine for predicting size fit satisfaction. The inputs for the machine learning model may be modified to solve for a variety of optimization goals. For example, the feature set of the model and the model type may be modified based on the target audience, target product for creation, and business goals. In some embodiments, the goal is to identify and manufacture a product that is sized to fit a target audience or a collection of product sizes to fit a wider target audience. Another goal may be to identify popular product silhouette categories that have high return rates due to poor sizing and fit errors. Another goal may be to optimize the sizing inventory of high demand products based on sales and inventory models. As described herein, the machine learning model and machine learning engine may be utilized to determine optimal values for variable size components of a difficult to fit product silhouette category. As another goal, the machine learning model and machine learning engine may be utilized to generate sizing and measurements for manufacturing new product sizes for customers who have difficulty finding clothes that fit well. Customers with fit challenges report fit issues such as products that are too long or short for one's body length, too tight in the thighs, too tight or loose in the chest, etc. By optimizing for size fit satisfaction with this target audience in mind, these fit challenges can be addressed by manufacturing or offering new product sizes using determined values for variable size components.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    training one or more machine learning models using sizing feedback data that includes a specified size of a specific subject and feedback of the specific subject regarding sizing of a plurality of items, and sizing profile data associated with the plurality of items that includes feedback of other subjects regarding sizing of the plurality of items, wherein a first machine learning model of the one or more machine learning models is a neural network machine learning model that is trained using training data that includes the sizing feedback data and the sizing profile data, wherein the neural network machine learning model includes multiple layers, wherein a final layer of the multiple layers outputs a result associated with a size fit prediction indicating a probability a specific item is predicted to be too large, too small, or fit perfectly on the specific subject, wherein new sizing profile data is received after the first machine learning model is trained and used to update to the first machine learning model;
    using a processor to determine a predicted size of the specific subject based on the specific subject's estimated size and feedback on items and to determine a predicted size of a specific item based on feedback received from the other subjects, wherein the predicted size of the specific subject is associated with an estimated actual size of the specific subject despite knowing the specified size of the specific subject used to train the one or more machine learning models;
    using the first machine learning model to determine a predicted size fit between the specific item and the specific subject, wherein the predicted size fit indicates a probability that the specific item fits the specific subject according to fit preferences associated with the specific subject;
    utilizing the predicted size fit to determine a sizing purchase metric that measures an impact sizing has on the specific subject's decision to purchase the specific item, wherein the sizing purchase metric indicates a probability that the specific subject will purchase the specific item, wherein the probability that the specific subject will purchase the specific item is reduced in response to determining a size mismatch between the fit preferences associated with the specific subject and the predicted size of the specific item; and
    ranking the specific item among a plurality of items based in part on the determined sizing purchase metric and the determined size mismatch.

2. The method of claim 1, wherein using the predicted size of the specific subject and the predicted size of the specific item to determine the predicted size fit includes determining a rank order of the specific item with respect to other items.

3. The method of claim 1, wherein the one or more machine learning models are further trained using a specified size of the specific item.

4. The method of claim 1, wherein the one or more machine learning models are further trained using specified sizes of the plurality of items.

5. The method of claim 1, wherein the one or more machine learning models are further trained using specified sizes of the other subjects.

6. The method of claim 1, wherein the one or more machine learning models are further trained using fit challenges.

7. The method of claim 6, wherein the fit challenges include a sleeve length, neck size, or chest size fit challenge.

8. The method of claim 1, wherein the one or more machine learning models are further trained using fit preferences.

9. The method of claim 8, wherein the fit preferences include a slim, a regular, and a relaxed fit preference.

10. The method of claim 8, wherein the fit preferences include a loose or a fitted fit preference.

11. The method of claim 1, wherein the one or more machine learning models are segmented by item categories.

12. The method of claim 11, wherein the item categories include top, bottom, and footwear.

13. The method of claim 1, further comprising:
presenting a user interface element to indicate the predicted size fit.

14. The method of claim 13, wherein the user interface element displays a probability the specific item is too large or too small for the specific subject.

15. The method of claim 13, wherein the user interface element is a badge displayed next to a representation of the specific item indicating the specific item is likely too large or too small for the specific subject.

16. The method of claim 1, wherein the specified size of the specific subject includes a top size, bottom size, height, weight, and one of a chest size or cup size.

17. The method of claim 1, wherein the specific item has a silhouette category.

18. A computer program product, the computer program product being embodied in a non-transitory computer readable storage medium and comprising computer instructions for:
training one or more machine learning models using sizing feedback data that includes a specified size of a specific subject and feedback of the specific subject regarding sizing of a plurality of items, and sizing profile data associated with the plurality of items that includes feedback of other subjects regarding sizing of the plurality of items, wherein a first machine learning model of the one or more machine learning models is a neural network machine learning model that is trained using training data that includes the sizing feedback data and the sizing profile data, wherein the neural network machine learning model includes multiple layers, wherein a final layer of the multiple layers outputs a result associated with a size fit prediction indicating a probability a specific item is predicted to be too large, too small, or fit perfectly on the specific subject, wherein new sizing profile data is received after the first machine learning model is trained and used to update to the first machine learning model;
determining a predicted size of the specific subject based on the specific subject's estimated size and feedback on items and a predicted size of a specific item based on feedback received from the other subjects, wherein the predicted size of the specific subject is associated with an estimated actual size of the specific subject despite knowing the specified size of the specific subject used to train the one or more machine learning models;
using the first machine learning model to determine the predicted size fit between the specific item and the specific subject, wherein the predicted size fit indicates a probability that the specific item fits the specific subject according to fit preferences associated with the specific subject;
utilizing the predicted size fit to determine a sizing purchase metric that measures an impact sizing has on the specific subject's decision to purchase the specific item, wherein the sizing purchase metric indicates a probability that the specific subject will purchase the specific item, wherein the probability that the specific subject will purchase the specific item is reduced in response to determining a size mismatch between the fit preferences associated with the specific subject and the predicted size of the specific item; and
ranking the specific item among a plurality of items based in part on the determined sizing purchase metric and the determined size mismatch.

19. A system, comprising:
a processor; and
a memory coupled with the processor, wherein the memory is configured to provide the processor with instructions which when executed cause the processor to:
train one or more machine learning models sizing feedback data that includes using a specified size of a specific subject and feedback of the specific subject regarding sizing of a plurality of items, and sizing profile data associated with the plurality of items that includes feedback of other subjects regarding sizing of the plurality of items, wherein a first machine learning model of the one or more machine learning models is a neural network machine learning model that is trained using training data that includes the sizing feedback data and the sizing profile data, wherein the neural network machine learning model includes multiple layers, wherein a final layer of the multiple layers outputs a result associated with a size fit prediction indicating a probability a specific item is predicted to be too large, too small, or fit perfectly on the specific subject, wherein new sizing profile data is received after the first machine learning model is trained and used to update to the first machine learning model;
determine a predicted size of the specific subject based on the specific subject's estimated size and feedback on items and a predicted size of a specific item based on feedback received from the other subjects, wherein the predicted size of the specific subject is associated with an estimated actual size of the specific subject despite knowing the specified size of the specific subject used to train the one or more machine learning models;
use the first machine learning model to determine the predicted size fit between the specific item and the specific subject, wherein the predicted size fit indicates a probability that the specific item fits the specific subject according to fit preferences associated with the specific subject;
utilize the predicted size fit to determine a sizing purchase metric that measures an impact sizing has on the specific subject's decision to purchase the specific item, wherein the sizing purchase metric indicates a probability that the specific subject will purchase the specific item, wherein the probability that the specific subject will purchase the specific item is reduced in response to determining a size mismatch between the fit preferences associated with the specific subject and the predicted size of the specific item; and
rank the specific item among a plurality of items based on the determined sizing purchase metric and the determined size mismatch.

\* \* \* \* \*